(12) United States Patent  (10) Patent No.: US 7,274,324 B2
Millikin et al.  (45) Date of Patent: Sep. 25, 2007

(54) APPARATUS AND METHOD OF TRACKING OBJECTS IN FLIGHT

(75) Inventors: Rhonda L. Millikin, Nepean (CA); Joseph R. Buckley, Kingston (CA)

(73) Assignee: Her Majesty the Queen in Right of Canada as Represented by the Minister of National Defense, Ottawa, Ontario (CA)

( * ) Notice: Subject to any disclaimer, the term of this patent is extended or adjusted under 35 U.S.C. 154(b) by 259 days.

(21) Appl. No.: 10/483,974

(22) PCT Filed: Jul. 8, 2002

(86) PCT No.: PCT/CA02/01031

§ 371 (c)(1),
(2), (4) Date: Jun. 17, 2004

(87) PCT Pub. No.: WO03/007012

PCT Pub. Date: Jan. 23, 2003

(65) Prior Publication Data

US 2004/0233098 A1   Nov. 25, 2004

Related U.S. Application Data

(60) Provisional application No. 60/304,481, filed on Jul. 9, 2001.

(51) Int. Cl.
*G01S 13/42* (2006.01)
*G01S 13/06* (2006.01)
*G01S 13/00* (2006.01)

(52) U.S. Cl. .................. 342/146; 342/73; 342/74; 342/89; 342/91; 342/94; 342/95; 342/118; 342/147; 342/175; 342/195

(58) Field of Classification Search .............. 342/59, 342/450–465, 89–103, 118–147, 155–158, 342/175, 195, 73–88
See application file for complete search history.

(56) References Cited

U.S. PATENT DOCUMENTS 2,602,923 A * 7/1952 Frazier .................. 342/59

(Continued)

FOREIGN PATENT DOCUMENTS

WO   WO99/36796   7/1999

OTHER PUBLICATIONS

Leslaw Paradowski, Unconventional algorithm for emitter position location in three-dimensional space using data from two-dimensional direction finding, Apr. 1994, pp. 246-250, Military University of Technology, The Institute of Radar Technology.

(Continued)

*Primary Examiner*—Bernarr E. Gregory
(74) *Attorney, Agent, or Firm*—Keusy, Tutunjian & Bitetto, P.C.

(57) ABSTRACT

A path in three-dimensions for an object in flight is determined according to a radar signal reflected by the object. The radar signal is transmitted at an offset angle from horizontal sufficient to capture the object within the transmitted radar signal. The transmitted radar signal is reflected by the object to form a reflected radar signal containing an indication of a position of the object. The reflected radar signal is received and used to determine two-dimensional position information for the object by detection of the indication of the position of the object in the received radar signal. Position information is derived in three-dimensions from the position information in two-dimensions. The path information representative of the path for the object is obtained from the position information in three-dimensions based on an optimization of a curvature of said path information.

37 Claims, 9 Drawing Sheets

U.S. PATENT DOCUMENTS

| | | | |
|---|---|---|---|
| 2,718,000 A | * | 9/1955 | Sunstein .................... 342/140 |
| 3,487,462 A | * | 12/1969 | Holberg ....................... 342/59 |
| 3,560,971 A | * | 2/1971 | Alsberg et al. ............... 342/59 |
| 3,618,086 A | * | 11/1971 | van Staaden et al. ......... 342/59 |
| 3,789,397 A | * | 1/1974 | Evans .......................... 342/59 |
| 4,751,511 A | * | 6/1988 | Komata et al. ............... 342/59 |
| 5,252,980 A | * | 10/1993 | Gray et al. ................... 342/59 |
| 5,341,141 A | * | 8/1994 | Frazier et al. ................ 342/59 |
| 5,557,282 A | | 9/1996 | Mertens |
| 6,229,473 B1 | * | 5/2001 | Doemens et al. ............. 342/59 |

OTHER PUBLICATIONS

Pierre Valin, Hassan Aurag, Mounia Kjirl, Initiating 3-D Target from 2-D Naval Radar Sensor Reports, In Signal and Data Processing of Small Targets 2000, pp. 369-377, Proceedings of SPIE vol. 404B (2000).

Bruce Cohen and Timothy C. Williams, "Short-Range Corrections for Migrant Bird Tracks on Search Radars", J. Field Ornithol., Summer 1980, vol. No. 3, p. 248-253.

* cited by examiner

APPARATUS AND METHOD OF TRACKING OBJECTS IN FLIGHT

CROSS REFERENCE TO RELATED APPLICATIONS

The present application claims priority from U.S. provisional patent application Ser. No. 60/304,481 filed on Jul. 9, 2001, hereby incorporated by reference.

TECHNICAL FIELD

The present invention relates to the field of object tracking via radar.

BACKGROUND ART

The tracking of objects in flight in three-dimensions from the ground has a multitude of applications. One such application is the tracking of birds for the purposes of monitoring migration and maintaining safety, especially in the vicinity of airports. While birds may be visually observed, many species migrate at night, making visual observation difficult. Such tracking of objects in flight entails surveying the air space to detect objects and obtaining the object's path in three-dimensions.

DISCLOSURE OF THE INVENTION

In accordance with one aspect of the present invention there is provided a method of determining a path in three-dimensions for an object in flight comprising: transmitting a radar signal at an offset angle from horizontal sufficient to capture the object within said transmitted radar signal, said transmitted radar signal being reflected by the object; receiving said reflected radar signal, said reflected radar signal containing an indication of a position of the object; detecting said indication of the position of the object in said received radar signal to determine position information in two-dimensions for the object; deriving position information in three-dimensions from said position information in two-dimensions; and obtaining path information for the object from said position information in three-dimensions based on a curvature of said path information.

In accordance with another aspect of the present invention there is provided a system for determining a path in three-dimensions for an object in flight comprising: a radar antenna for transmitting and receiving a radar signal, said radar antenna being positioned at an offset angle from horizontal sufficient to capture the object within said radar signal beam, a transmitted radar signal being reflected by the object to form a received radar signal containing an indication of a position of the object; a radar controller for managing transmission and receipt of said radar signal from said radar antenna; a processing controller for detected said indication of the position of the object in said received radar signal to determine position information in two-dimensions for the object; and a path derivation mechanism for deriving position information in three-dimensions from said position information in two-dimensions and obtaining path information in three-dimensions for the object from said position information in three-dimensions based on a curvature of said path information.

In accordance with a further aspect of the present invention there is provided a method of determining a path in three-dimensions for an object in flight comprising: (a) transmitting a radar signal at an offset angle from horizontal sufficient to capture the object within said transmitted radar signal, said transmitted radar signal being reflected by the object; (b) receiving said reflected radar signal, said reflected radar signal containing an indication of a position of the object; (c) detecting said indication of the position of the object in said received radar signal, a plurality of said detected indications forming a plurality of detection points, said plurality of detection points producing position information in two-dimensions for the object, said received radar signal including two measurements for each of said plurality of detection points; (d) deriving position information in three-dimensions from said position information in two-dimensions, comprising: (d-i) estimating a third measurement within a predetermined range in a width of said transmitted radar signal when said anticipated path type indicates a straight path, said third measurement and said position information in two-dimensions forming said position information in three-dimensions; (d-ii) deriving a third measurement for each of said plurality of detection points based on said two measurements and a geometric relationship between said two measurements and said third measurement when a curvature for said path information indicates a curved path and a plurality of detection point segments has been provided, said third measurements and said plurality of detection points forming said position information in three-dimensions; and (e) obtaining path information for the object from said position information in three-dimensions, comprising: (e-i) interpolating estimated path information in three-dimensions from said position information in three-dimensions; (e-ii) repeating steps (d-i) and (e-i) when said anticipated path type indicates a straight path to form estimated path information for each possible third measurement with a first predetermined precision within said predetermined range in the width of said transmitted radar signal; and (e-iii) when said curvature indicates a curved path, segmenting said plurality of detection points to form a plurality of detection point segments; (e-iv) repeating steps (d-i) to (e-ii) to determine an optimal curvature for each of a plurality of path information having a curvature, each of said plurality of path information corresponding to each of said plurality of detection point segments; and (e-v) when a curvature for one of said plurality of detection point segments indicates a curved path, evaluating said estimated path information for each estimated third measurement based on a curvature for said estimated path information to obtain an optimal path having an optimal curvature from said estimated path information for each estimated third measurement.

In accordance with yet another aspect of the present invention there is provided a computer readable medium having stored thereon computer-executable instructions for determining a path in three-dimensions for an object in flight comprising: (a) transmitting a radar signal at an offset angle from horizontal sufficient to capture the object within said transmitted radar signal, said transmitted radar signal being reflected by the object; (b) receiving said reflected radar signal, said reflected radar signal containing an indication of a position of the object; (c) detecting said indication of the position of the object in said received radar signal to determine position information in two-dimensions for the object; (d) deriving position information in three-dimensions from said position information in two-dimensions; and (e) obtaining path information for the object from said position information in three-dimensions based on a curvature of said path information.

In accordance with a further aspect of the present invention there is provided a computer readable medium having stored thereon computer-executable instructions for determining a path in three-dimensions for an object in flight comprising: (a) transmitting a radar signal at an offset angle from horizontal sufficient to capture the object within said transmitted radar signal, said transmitted radar signal being reflected by the object; (b) receiving said reflected radar signal, said reflected radar signal containing an indication of a position of the object; (c) detecting said indication of the position of the object in said received radar signal, a plurality of said detected indications forming a plurality of detection points, said plurality of detection points producing position information in two-dimensions for the object, said received radar signal including two measurements for each of said plurality of detection points; (d) deriving position information in three-dimensions from said position information in two-dimensions, comprising: (d-i) estimating a third measurement within a predetermined range in a width of said transmitted radar signal when said anticipated path type indicates a straight path, said third measurement and said position information in two-dimensions forming said position information in three-dimensions; (d-ii) deriving a third measurement for each of said plurality of detection points based on said two measurements and a geometric relationship between said two measurements and said third measurement when a curvature for said path information indicates a curved path and a plurality of detection point segments has been provided, said third measurements and said plurality of detection points forming said position information in three-dimensions; and (e) obtaining path information for the object from said position information in three-dimensions, comprising: (e-i) interpolating estimated path information in three-dimensions from said position information in three-dimensions; (e-ii) repeating steps (d-i) and (e-i) when said anticipated path type indicates a straight path to form estimated path information for each possible third measurement with a first predetermined precision within said predetermined range in the width of said transmitted radar signal; and (e-iii) when said curvature indicates a curved path, segmenting said plurality of detection points to form a plurality of detection point segments; (e-iv) repeating steps (d-i) to (e-ii) to determine an optimal curvature for each of a plurality of path information having a curvature, each of said plurality of path information corresponding to each of said plurality of detection point segments; and (e-v) when a curvature for one of said plurality of detection point segments indicates a curved path, evaluating said estimated path information for each estimated third measurement based on a curvature for said estimated path information to obtain an optimal path having an optimal curvature from said estimated path information for each estimated third measurement.

BRIEF DESCRIPTION OF THE DRAWINGS

The present invention will be described in conjunction with the drawings in which.

BEST MODE FOR CARRYING OUT THE INVENTION

Figure 1:
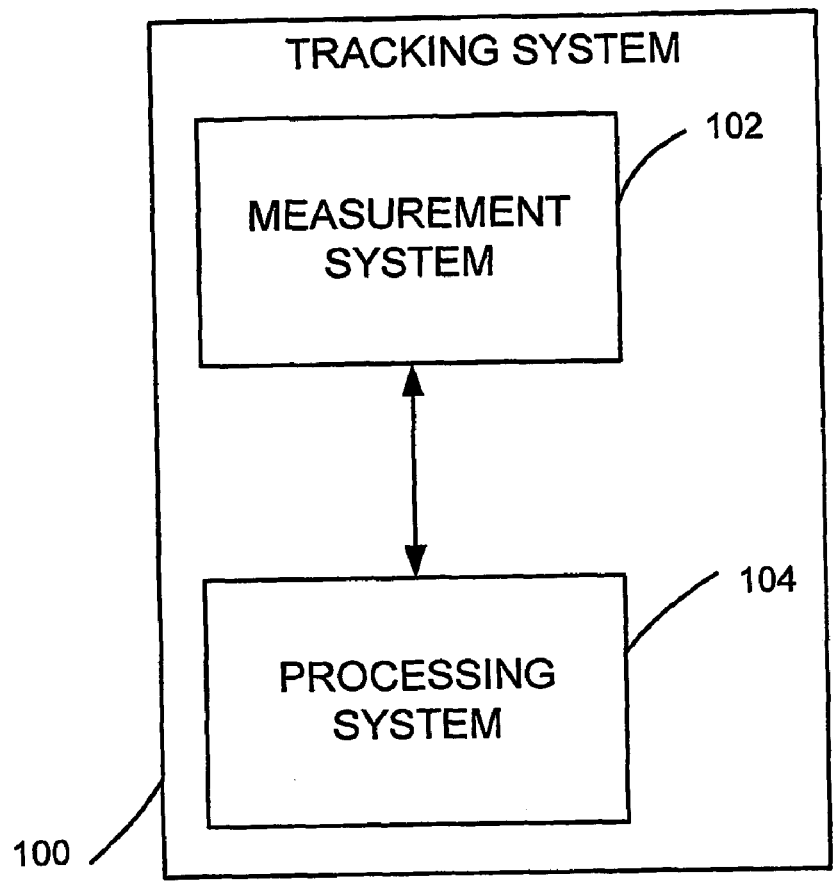
FIG. 1 is a general system diagram of a radar-based system for tracking objects in flight according to an embodiment of the present invention.

FIG. 1 shows a tracking system 100 for tracking objects in flight via the use of radar. The tracking system 100 has a measurement system 102 and a processing system 104. The measurement system 102 obtains information on detected objects in the air that can be used for later processing to determine flight paths of the detected objects. In the present invention the measurement system 102 is a radar system that obtains azimuth and range information for the object according to various techniques. The processing system 104 performs processing functions on the measurement information from the measurement system 102 to obtain three-dimensional coordinates of the path of the object.

Figure 2:
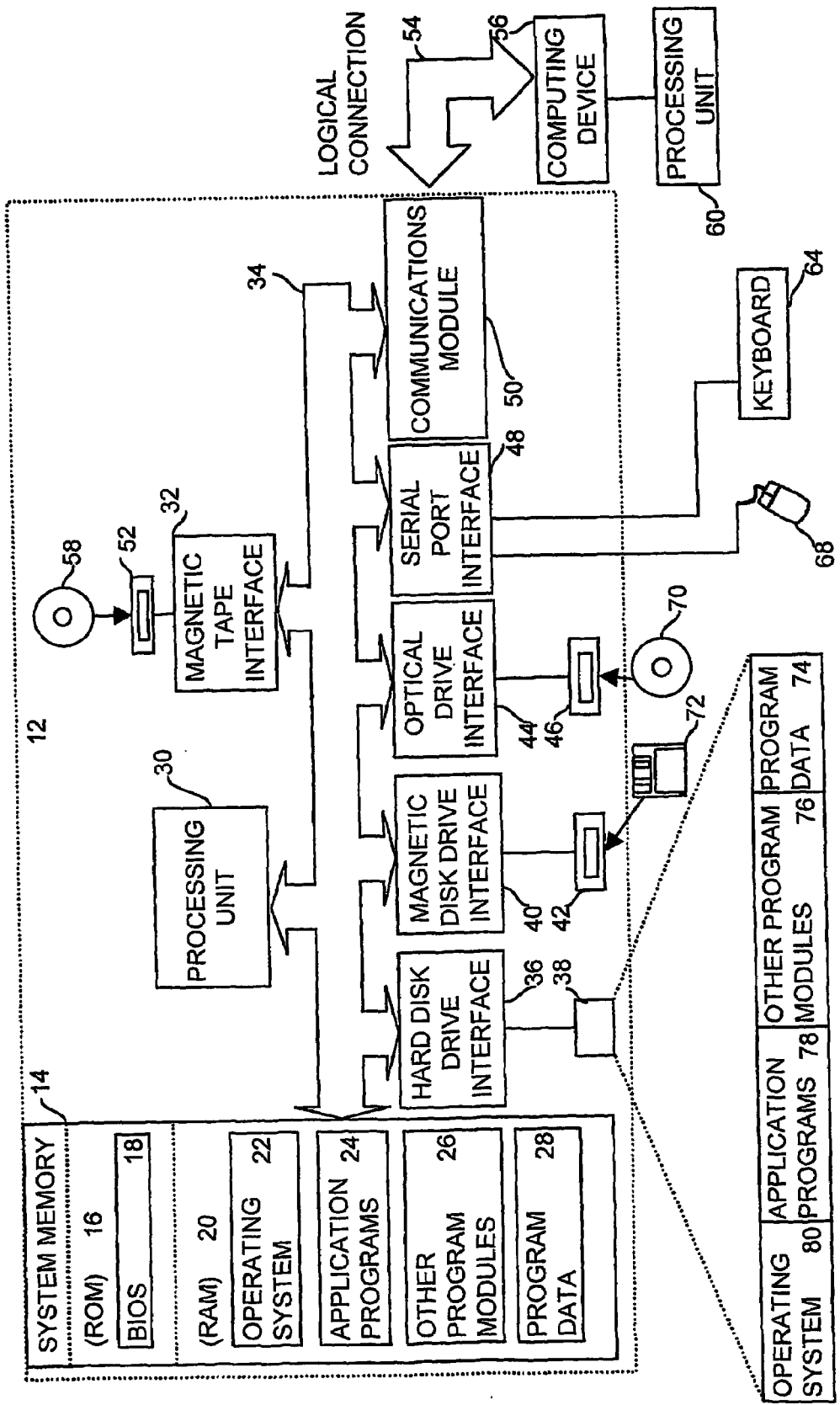
FIG. 2 represents an example of a suitable computing environment in which processing functions of the present invention may be implemented.

FIG. 2 and the associated description represent an example of a suitable computing environment 10 in which processing functions of the present invention may be implemented. While the processing functions and the processing system 104 will be described in the general context of computer-executable instructions of a computer program, the processing functions can also be implemented in combination with other program modules.

Generally, program modules include routines, programs, components, data structures and the like that perform particular tasks or implement particular abstract data types. Further, the processing functions of the present invention can also be implemented using or in combination with other computer system configurations, including hand-held devices, multiprocessor systems, microprocessor-based or programmable consumer electronics, minicomputers, mainframe computers, and distributed computing environments where program modules may be located in both local and remote memory storage devices.

With reference to FIG. 2, the processing functions of the processing system 104 may be implemented within a general purpose computing device in the form of a conventional computer 12, including a processing unit 30, a system memory 14, and a system bus 34 that couples various system components including the system memory 14 to the processing unit 30. The system memory 14 includes read only memory (ROM) 16 and random access memory (RAM) 20.

A basic input/output system 18 (BIOS), containing the basic routines that help to transfer information between elements within the computer 12 (e.g. during start-up) is stored in ROM 16. The computer 12 further includes a hard disk drive 38 for reading from and writing to a hard disk (not shown), a magnetic disk drive 42 for reading from or writing to a removable magnetic disk 72, an optical disk drive 46 for reading from or writing to a removable optical disk 70 such as a CD ROM or other optical media and a magnetic tape drive 52 for reading from or writing to a magnetic tape 58, all of which are connected to the system bus 34 by respective interfaces 36, 40, 44. The drives 38, 42, 46, 32 and their associated computer-readable media 72, 70 provide non-volatile storage of computer readable instructions, data structures, program modules and other data for the computer 12. Although the exemplary environment described herein employs certain disks, it should be appreciated by those skilled in the art that other types of computer readable media for storing data may also be employed.

A number of program modules may be stored on the disks 72, 70, ROM 16 or RAM 20, including an operating system 22, one or more application programs 24, other program modules 76, and program data 74. Commands and information may be entered into the personal computer 12 through input devices (e.g. a keyboard 64, pointing device 68, a microphone, joystick, etc.). These input devices may be connected to the processing unit 30 through a serial port interface 48, a parallel port, game port or a universal serial bus (USB). A monitor 52 or other type of display device may also connected to the system bus 34 via an interface, such as a video adapter 32.

The computer 12 operates in a networked environment using logical connections to one or more remote computing devices 56, such as another personal computer, a handheld device, a mini computer, microprocessor-based or programmable consumer electronics or any other such device capable of displaying graphics information. The logical connection depicted in FIG. 2 is a communications network 54, which may be a wireless network, a packet-switching network, etc.

The computer 12 is connected to the communications network 54 through a communications module 50. The operations of the processing functions may be distributed between the two computers 12, 56, such that one acts as a server and the other as a client (see FIG. 2). Operations of the processing functions for each computer 12, 56 (client and server) may be stored in RAM 20 of each computer 12, 56 as application programs 24, other program modules 26, or on one of the disks 38, 42, 46. It will be appreciated that the network connections shown are exemplary and other means of establishing a communications link between the computers may be used.

Figure 3:
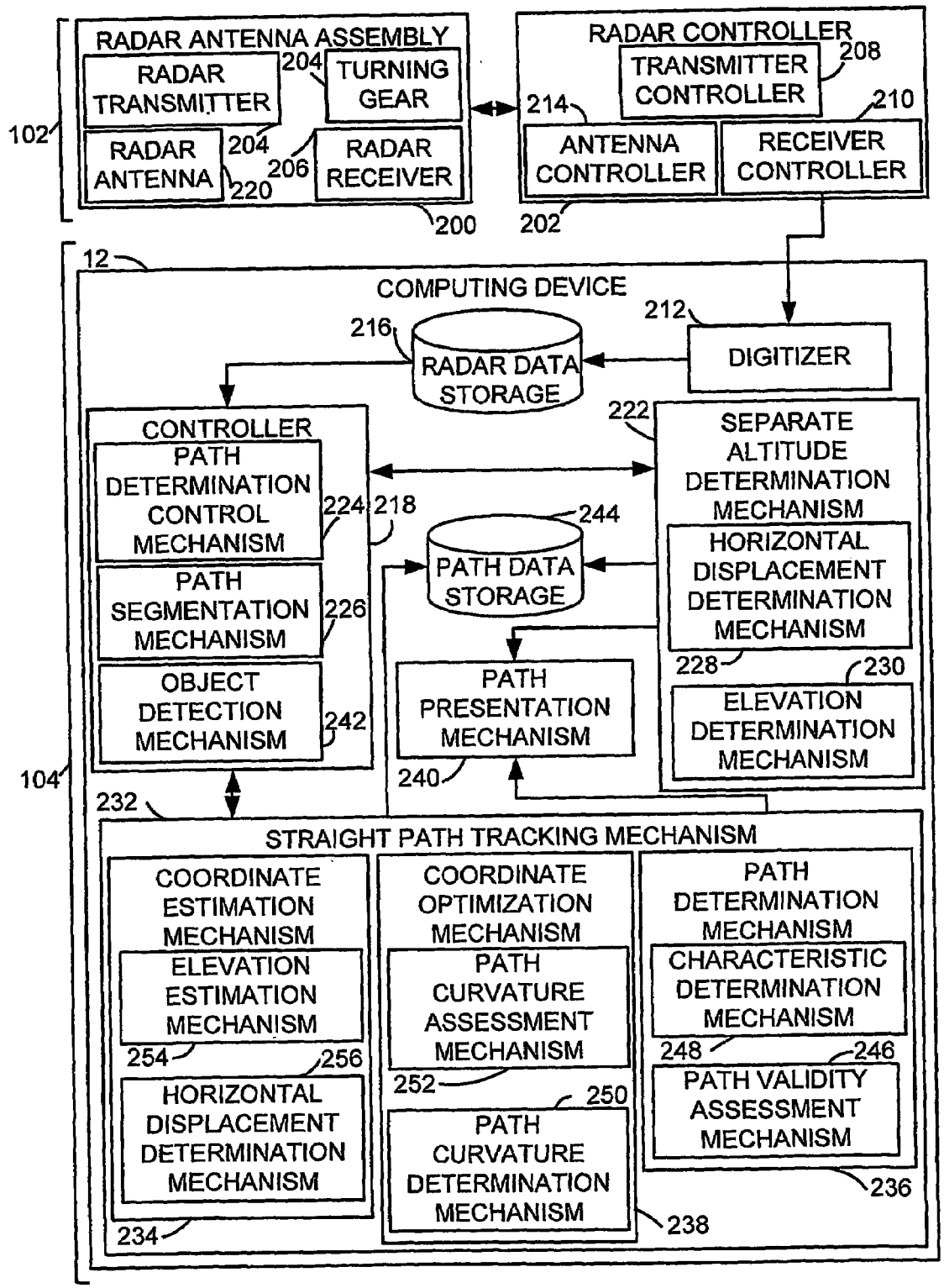
FIG. 3 is a detailed system diagram of a radar-based system for tracking objects in flight shown in FIG. 1 according to an embodiment of the present invention.
Figure 4A:
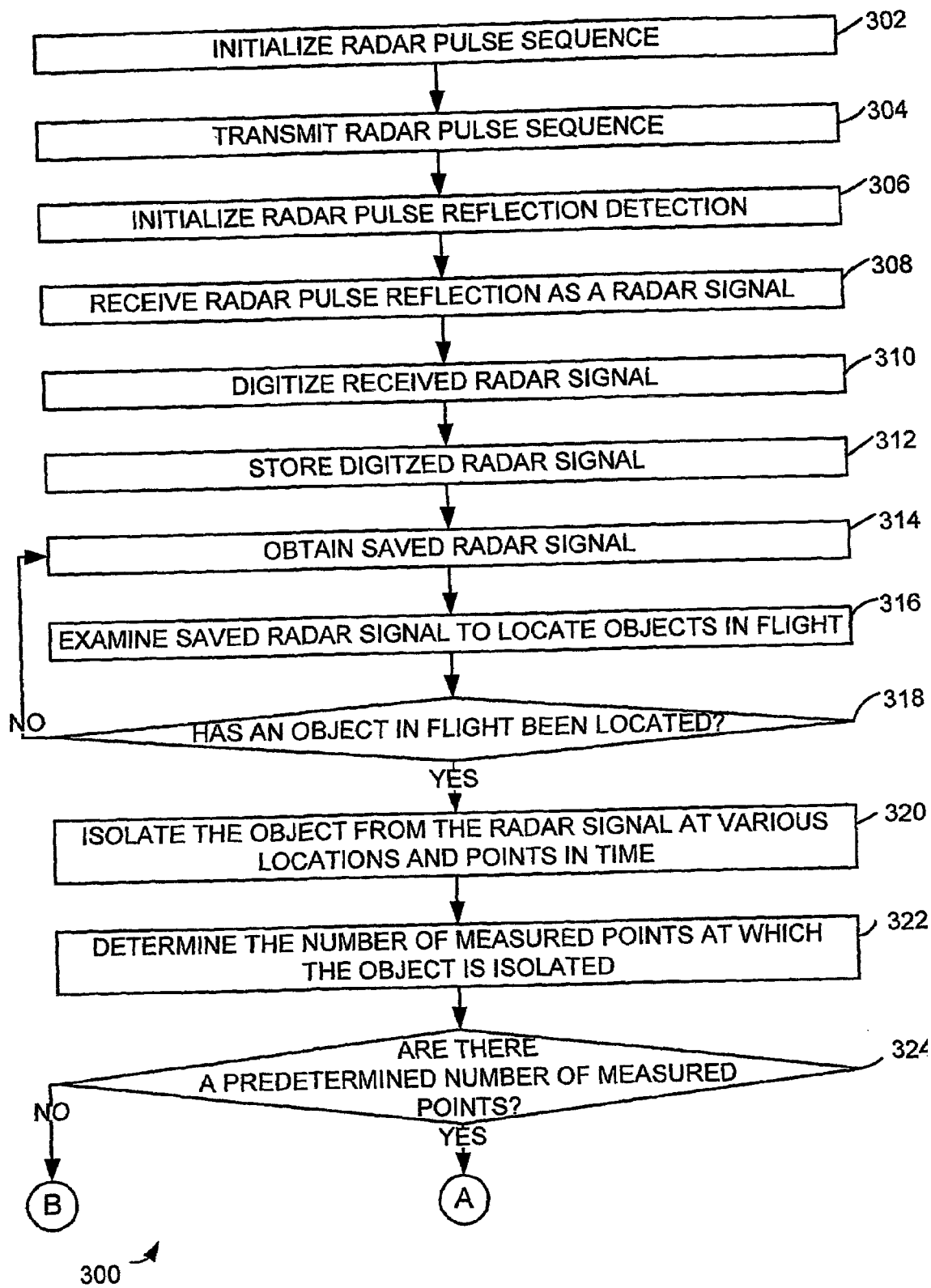
FIGS. 4A to E is a flow chart representing a method of tracking objects in flight using radar according to an embodiment of the present invention.
Figure 4B:
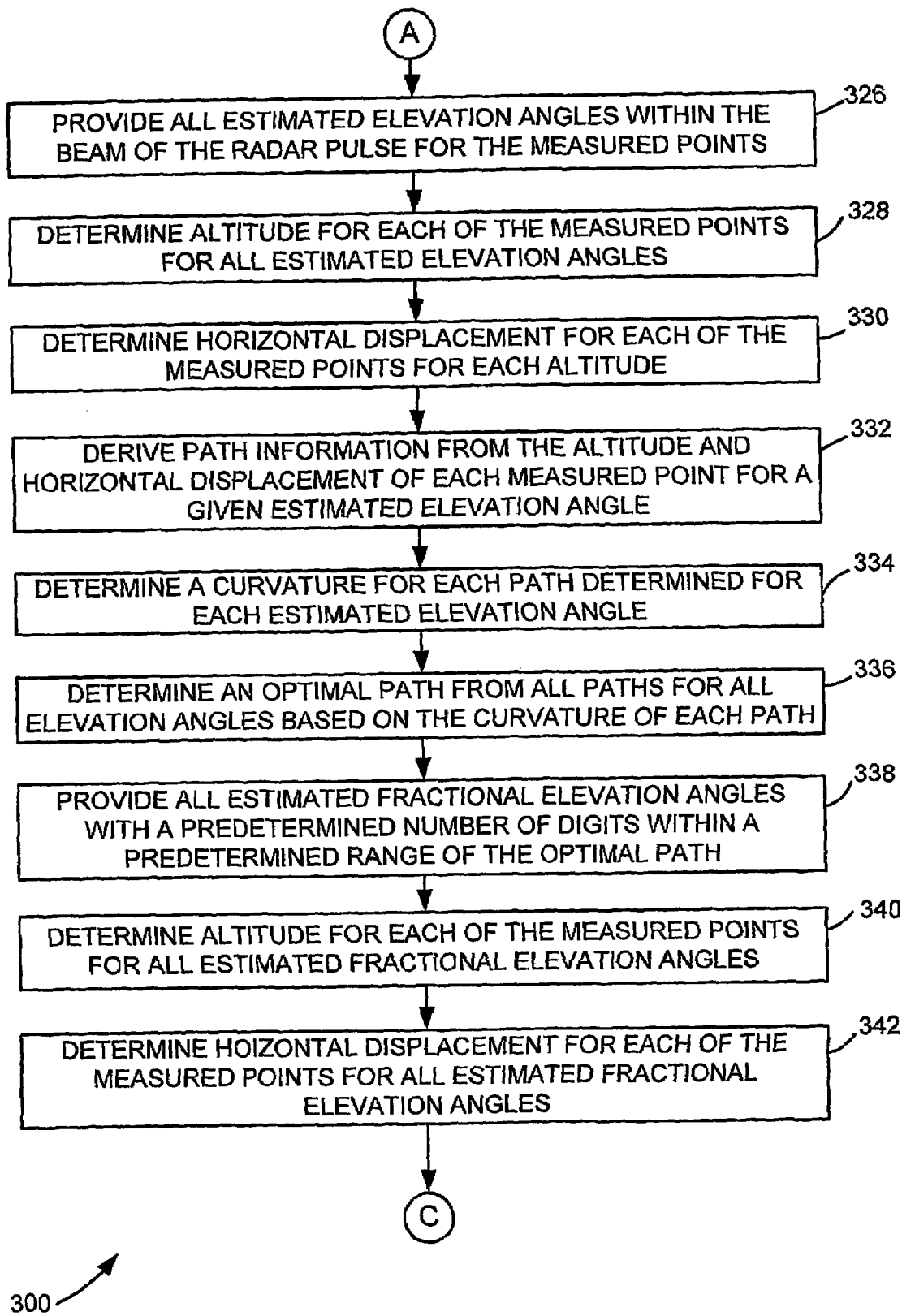
Figure 4C:
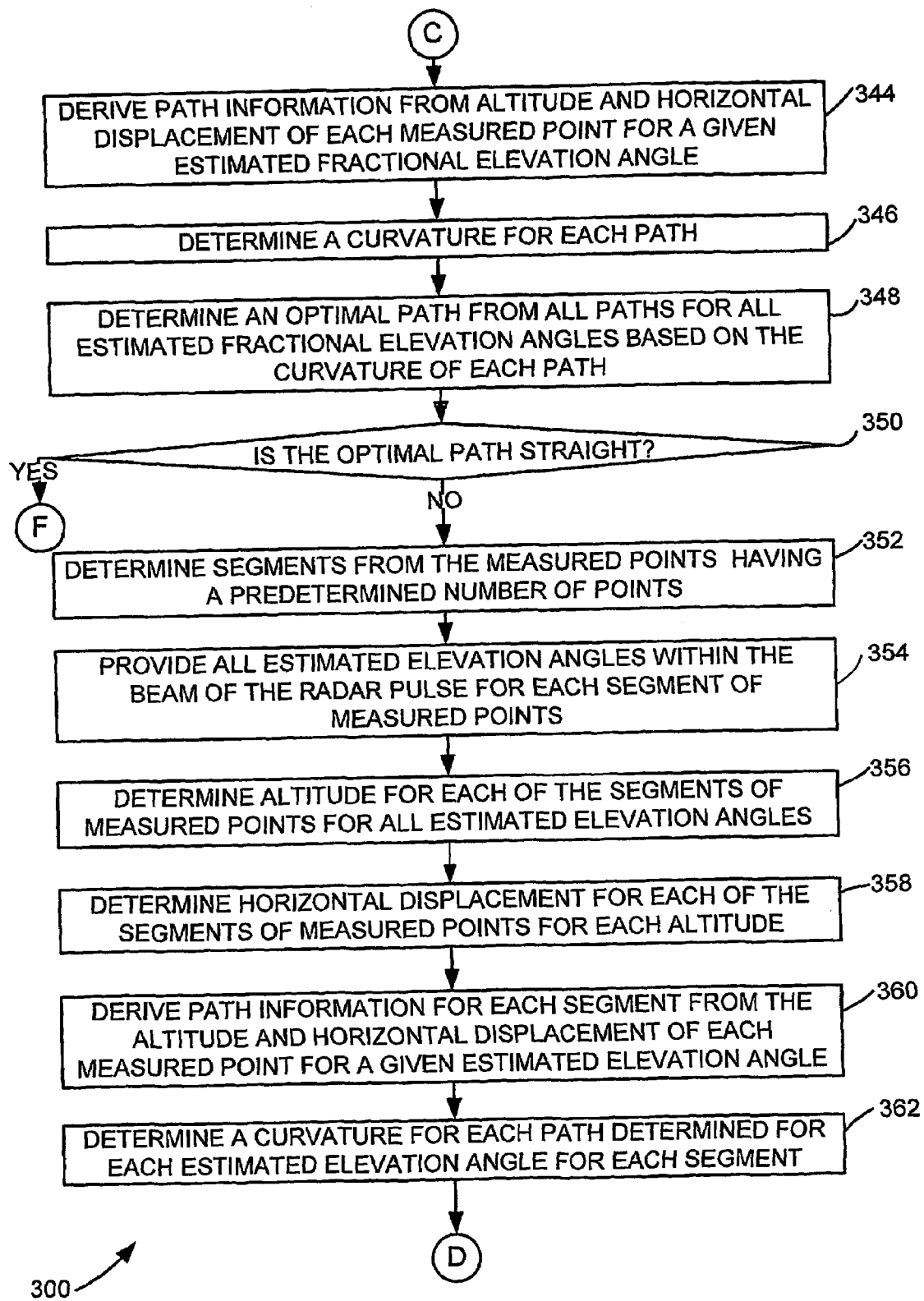
Figure 4D:
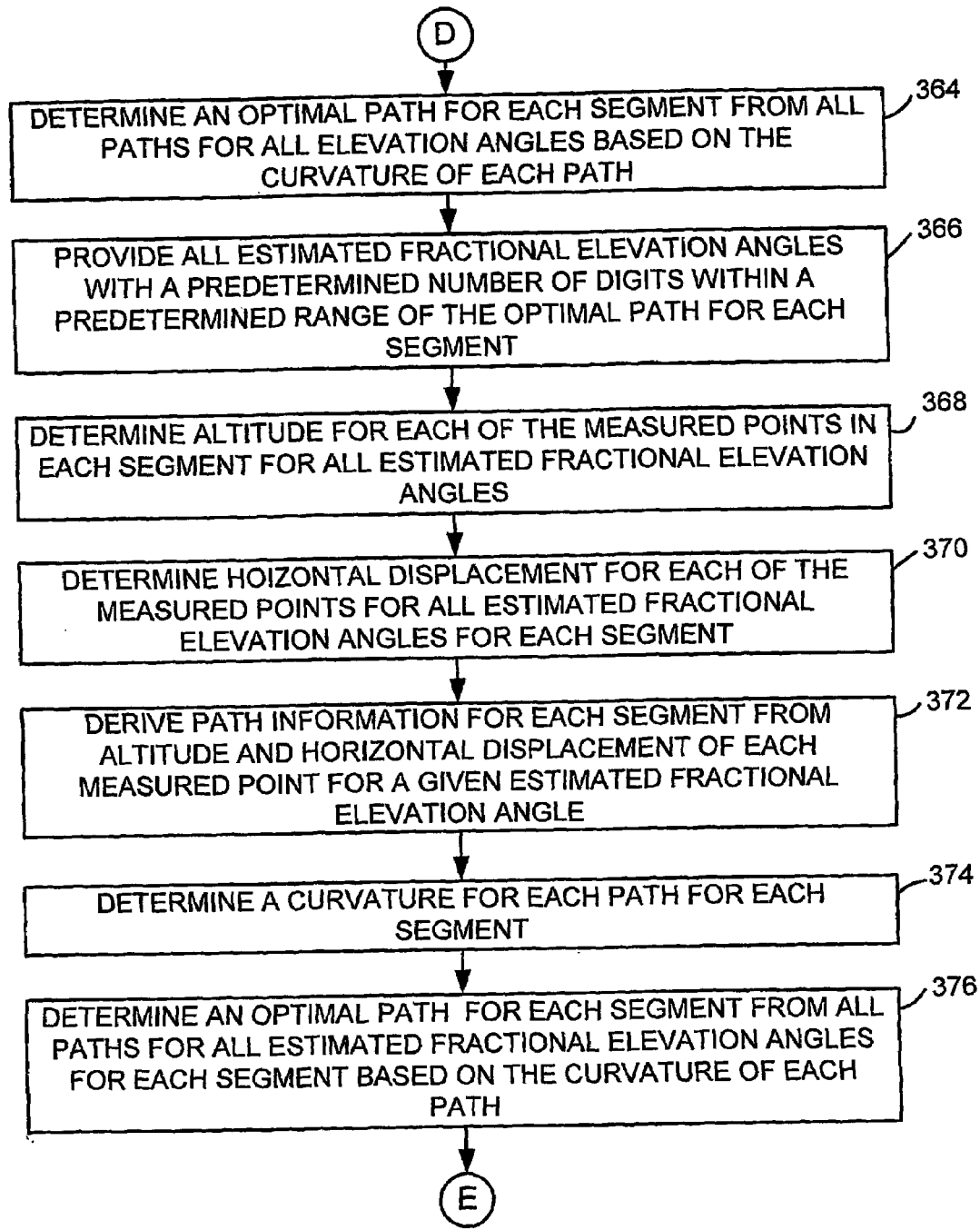
Figure 4E:
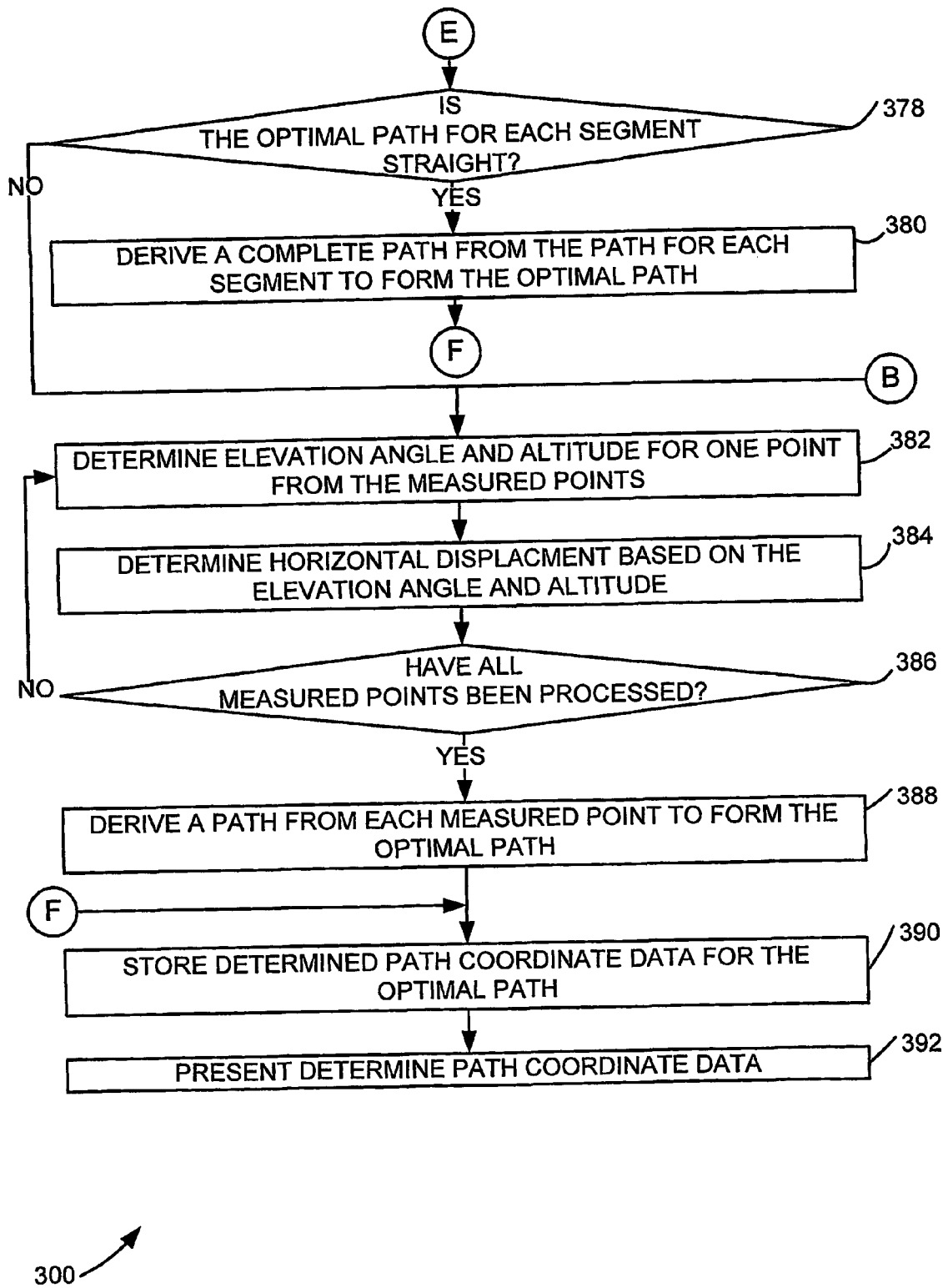

FIG. 3 is a detailed system diagram of the tracking system 100 shown in FIG. 1. The measurement system 102 obtains two-dimensional information on the location of the object with respect thereto and the processing system 104 derives three-dimensional location information for the object from the two-dimensional location information.

The measurement system 102 includes a radar antenna assembly 200 that transmits and receives radar pulses through a radar antenna 220 and a radar controller 202 for controlling the radar antenna 200. The radar antenna assembly 200 is composed of a radar transmitter 204, a radar receiver 206, the radar antenna 220 and a turning gear 260. The radar transmitter 204 transmits radar pulse sequences under the control of the radar controller 202. The radar receiver 206 receives radar pulses that are reflected by objects in flight back to the radar antenna 220. These received radar pulses indicate a range to the object(s) reflecting the radar pulses to the radar antenna 220 by means such as the strength of the received radar pulses. The turning gear 260 rotates the radar antenna 220 in a predetermined scan pattern under the controller of the radar controller 202.

In an exemplary embodiment, the radar antenna 220 of the present invention is a marine radar modified to obtain two-dimensional information from objects flying above the antenna 220. The antenna 220 is tilted such that the range of a received radar pulse provides an offset angle from hoirzontal and a reasonable height measurement. For example, the radar antenna 220 may be raised 73° from the horizontal such that a beam of radar pulses from the antenna 220 is approximately 60° off of the horizon based on a radar pulse beam with of 26°, thus reducing area not covered by a radar pulse used for detecting objects in flight.

The radar controller 202 has a transmitter controller 208, a receiver controller 210, and an antenna controller 214. The antenna controller 214 oversees the process of transmitting and receiving radar pulses, including positioning and controlling movement of the radar antenna 220 via the turning gear 260. The transmitter controller 208 controls characteristics of the radar pulses transmitted from the radar transmitter 204, such as, transmission frequency and wavelength, radar pulse length and radar pulse sequencing. The receiver controller 210 controls characteristics of the radar receiver 206 for detecting reflected radar pulses, or a radar signal, such as, a center frequency for radar pulse detection scanning, and a threshold frequency and amplitude for radar pulse detection. The receiver controller 210 obtains the radar signal in an analog form from the radar receiver 206 and provides the radar signal to the processing system 104. The radar controller 202 functions according to known techniques for transmitting and receiving radar pulses.

The radar transmitter 204 transmits radar pulse sequences at given time intervals with the radar antenna 220 rotating at a predetermined speed, thus there is a predetermined azimuth distance that the radar antenna 220 travels during each radar pulse. The radar receiver 206 obtains the azimuth distance at which a measurement is obtained with the total azimuth distance over which the radar receiver 206 being divided into equally spaced bins dictating how specific the measurement of the azimuth will be.

The processing system 104 may be employed on the general computing device 12 shown in FIG. 2. A digitizer 212 of the processing system 104 obtains the analog radar signals from the radar controller 202. The digitizer 212 performs digital sampling on the radar signal to convert the radar signal from an analog form to a digital form. The digital radar signal is stored in a radar data storage 216 by the digitizer 212.

Figure 5:
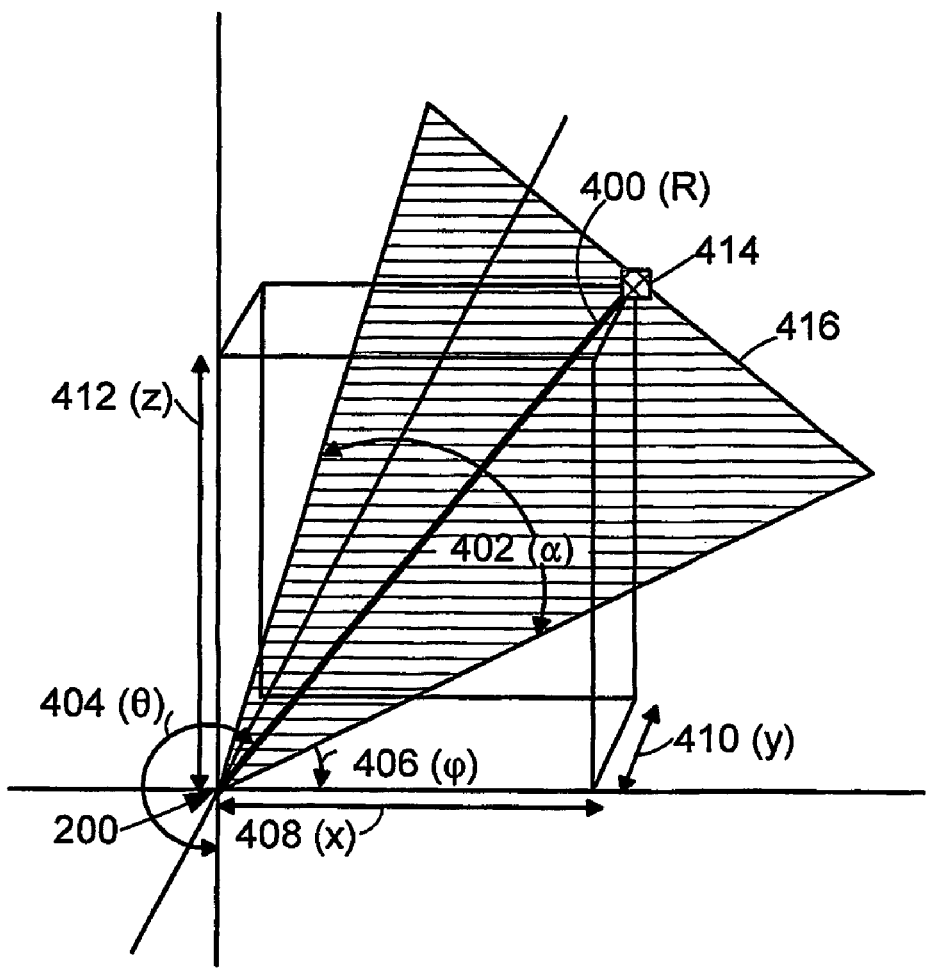
FIG. 5 illustrates the measurements obtained by the radar-based system in FIG. 3 and information derived therefrom.

The digital radar signal from the digitizer 212 contains information on any objects that were detected in the form of the azimuth angle of the radar antenna 220 at which the measurement containing an indication of the object(s) was taken as well as the range to the object. FIG. 5 illustrates the measurements obtained by the reflected radar pulses (400 to 404) and the position information of the object derived from the reflected radar pulses (406 to 412). Due to a large beamwidth α (402) of the radar pulses (416) in the vertical plane, the radar beam tilt angle φ (406) at which an object 414 is located has a large uncertainty. For any particular slant range R (400) with radar beam tilt φ (406) and azimuth angle θ (404), an estimate of altitude z (412) and horizontal displacement x (408) and y (410) is z=R sin φ, x=R cos φ sin θ and y=R cos φ cos θ; however, all have large uncertainties. Estimates of the altitude z (412) and horizontal displacement x,y (408, 410) are processed according to the curvature of a path of the object 414 for improvement of the estimated position information.

A controller 218 in the processing system 104 obtains the radar signals from the radar data storage 216 to orchestrate further processing of these signals. The controller 218 may poll the radar data storage 216 at predetermined intervals to obtain newly acquired radar signals therefrom. Alternatively, the controller 218 may be informed of newly acquired radar signals in the radar data storage 216 thus allowing the radar signals to be obtained in response thereto. Alternatively, an external request to check for newly acquired radar signals may be given to the controller 218, in response to which the radar data storage 216 is checked for newly acquired radar signals.

The controller 218 has an object detection mechanism 242, a path determination control mechanism 224 and a path segmentation mechanism 226. The object detection mechanism 242 searches the radar signal generated by the measurement system 102 to detect an object. An object in the radar signal may be indicated by any deviation above a predetermined threshold or, alternatively, any deviation above a predetermined threshold from a baseline level of the radar signal. The object detection mechanism 242 may use any of a number of algorithms known in the art for detecting objects from a radar signal.

The path determination control mechanism 224 obtains the radar signal from the object detection mechanism 242 after an object has been detected. The path determination mechanism 224 isolates the object at various locations and points in time to determine the number of measured points for the object. Isolation of the object involves separating measured points for the object from information on other objects or noise in the radar signal. The selection of measured points for an object relies on various characteristics obtained from a first point at which the object was first detected within the range of the radar pulses. That is, determination of the measured points takes into consideration successive changes in the azimuth and range measurements from the first point. Successive changes in azimuth and range measurements that do not fall within expected parameters (e.g. predicted direction and speed of object) are not considered to be part of the measured points for the object. The expected parameters may be based on the type of object that the system 100 is trying to locate and track. For example, large changes in the azimuth angle at which the object is detected for subsequent points (indicating the speed at which the object is travelling) and the range of the object (indicating the position of the object, such as altitude and distance traveled) may be an indication that a subsequently detected point is for the originally detected object.

The path determination control mechanism 224 passes the measured points to a straight path tracking mechanism 232 or a separate altitude determination mechanism 222 where a path can be derived from the measured points. Whether the measured points are passed to the straight path tracking mechanism 232 or the separate altitude determination mechanism 222 depends on whether or not previous attempts at path determination from the measured points have been made. The straight path tracking mechanism 232 determines path information for straight paths. The separate altitude determination mechanism 222 determines path information for paths that are not straight.

The path determination control mechanism 224 assumes that the measured points will form a straight and level path; thus, the measured points are initially provided to the straight path tracking mechanism 232. If the straight path tracking mechanism 232 returns an indication that the path is not straight and level then the path determination control mechanism 224 uses a path segmentation mechanism 226 to segment the measured points form multiple segments. The path determination control mechanism 224 provides each segment to the straight path tracking mechanism 232 where path segments are derived. If any of these path segments are returned to the path determination control mechanism 224 with an indication that the path is not straight and level then the measured points, either the entire set or only the segment, is provided to the separate altitude determination mechanism 222 for derivation of a path. Path information obtained from each segment of measured points may be combined by the path determination control mechanism 224 to form a complete path. If the set of measurement points for the object does not meet the predetermined number threshold then the set of measured points is provided to the separate altitude determination mechanism 222.

The path segmentation mechanism 226 may segment the measured points to provide a predetermined number of measured points for each segment. Alternatively, the segments may be determined according to various characteristics of the measured points, such as the amount by which subsequent values change.

The straight path tracking mechanism 232 processes sets of measured points that are determined to form a straight and level path while the object is within range of the radar pulses. The straight path tracking mechanism 232 has a coordinate estimation mechanism 234, a coordinate optimization mechanism 238 and a path determination mechanism 236.

The coordinate estimation mechanism 234 determines an estimated three-dimensional position coordinate for each measured point in the set based on the two-dimensional position information for each measured point. The coordinate estimation mechanism 234 includes an elevation estimation mechanism 254 and a horizontal displacement determination mechanism 256. Since the information for each measured point only contains range and azimuth angle information, the elevation angle for the object at each point is estimated by the elevation estimation mechanism 254. The elevation estimation mechanism 254 starts with the assumption that the target is directly above the radar at 90° at the point when the object is closest to the radar antenna 220. The elevation angle is iterated by the elevation estimation mechanism 254 between 90° (directly overhead) and the elevation angle of the bottom edge of the beam of the radar pulses.

For each estimated elevation angle, the elevation estimation mechanism 254 provides the elevation angle to the horizontal displacement determination mechanism 256 to have the corresponding horizontal displacement determined to provide position information for each possible elevation angle. The altitude position z of the object is determined from the elevation angle $\phi$ estimation and the range R. For example, when the estimated elevation angle $\phi$ is directly overhead (90°) the altitude position z will be at its greatest possible measurement ($Z_{maximum}$=R) as there would be no horizontal displacement. For each estimated elevation angle $\phi$ the difference between the greatest possible altitude position $z_{maximum}$ and the altitude position z given the estimated elevation angle $\phi$ is determined to provide the current altitude position z.

For each altitude position z determined for each estimated elevation angle $\phi$ the horizontal position x and y for the object is also determined. The horizontal range $R_h$ is determined based on the measured range value R and the determined altitude position z. Each of the horizontal coordinates x and y can be individually determined based on the horizontal component of the range $R_h$ and the azimuth angle for the measured point $\theta$. This produces a series of three-dimensional position coordinates for each measured point, one corresponding to each estimated elevation angle $\phi$. Each measured point is processed in this manner to produce a series of three-dimensional position coordinates forming a path for each of the estimated elevation angle $\phi$. Each set of three-dimensional position information for each estimated elevation angle $\phi$ produces path information for that given estimated elevation angle $\phi$.

The path information for each estimated elevation angle $\phi$ is supplied to the coordinate optimization mechanism 238 where the horizontal curvature of each path is assessed. The coordinate optimization mechanism 238 includes a path curvature determination mechanism 250 and a path curvature assessment mechanism 252.

The path curvature determination mechanism 250 determines curvature for the horizontal component of each path. The path curvature determination mechanism 250 links the individual three-dimensional positions for an estimated elevation angle φ and using curve estimation techniques, such as those that are well known in the art, to provides a path for the object. Curvature of a path is determined by the length of the semi-minor axis of an ellipse formed by a cusp on the path either towards or away from the location of the radar antenna 220. When the estimated elevation angle φ is too high the cusp points towards the radar antenna 220 whereas when the estimated elevation angle φ is too low the cusp points away from the radar antenna. The path curvature determination mechanism 250 is able to provide a measurement of the length of this cusp.

After the path and its curvature have been determined the path curvature determination mechanism 250 provides this information to a path determination mechanism 236 for assessment of the validity of each path. A path is considered to be valid if various characteristics such as intensity of the returned pulses corresponding to each measured point in the path are consistent with the measured point position, the velocity of the object through each segment of the path, etc.

The path determination mechanism 236 includes a characteristic determination mechanism 248 and a path validity assessment mechanism 246. The characteristic determination mechanism 248 determines values for the other characteristics on which the validity assessment of the path will be made. The path validity assessment mechanism 246 compares the values for each characteristic determined for a path against predetermined thresholds and acceptable values based on the object type being monitored. Any path not meeting the predetermined thresholds and acceptable values is considered invalid and removed from further consideration.

The path curvature assessment mechanism 252 manages the process of determining a path from all determined paths for all elevation angles φ that minimizes the curve or length of the cusp. The path curvature assessment mechanism 252 determines the path, and its corresponding elevation angle, that minimize the curvature of the path. The curvature of a path may be assessed using neutral regression to minimize cross-line variance to provide a path as straight as possible, which occurs when the cross-line variance is at a minimum.

The coordinate optimization mechanism 238 performs an optimization function to determine the path that has the smallest curve. This may be performed by well known regression functions such as neutral regression.

After the path curvature assessment mechanism 252 has determined the straightest path, the information for the straightest path is provided to the coordinate estimation mechanism 234 with an indication of a degree of refinement so that the process of determining coordinates can be performed again within a predetermined range of the elevation angle φ corresponding to the straightest path at smaller increments than were used for the original elevation angle φ estimation. For example, if the original elevation angle φ estimation was performed using integers then the second stage should be performed using tenths of a degree. A second set of paths and the corresponding straightest path are determined by the coordinate optimization mechanism 238 based on the refined set of estimated elevation angles φ and corresponding three-dimensional position information. This results in a more refined elevation angle φ and corresponding straightest path.

After a predetermined level of precision has been reached for the path, the resulting straightest path is set as an optimal path indicating the path that the object has traveled.

If the set of measured points cannot be assumed to create a straight and level path or if the number of measured points in the set does not meet a predetermined number then a separate altitude determination mechanism 222 determines the path and three-dimensional position information. The separate altitude determination mechanism 222 determines the altitude separately for each point in the set of measured points, as opposed to the straight path tracking mechanism 232 that determines the altitude for an entire path.

The separate altitude determination mechanism 222 includes an elevation determination mechanism 230 and a horizontal displacement determination mechanism 228. The elevation determination mechanism 230 determines an estimated elevation for a given measured point from the set based on various characteristics of the radar pulses transmitted and received at the radar antenna 220 such as the range R, the number of azimuth bins into which the radar receiver 206 area has been divided, the number of bins covered by each pulse and the azimuth distance covered by each pulse. The relationship between the range R and the altitude for the object z and the horizontal displacement $R_h$ from the radar antenna 220 is $R^2 = R_h^2 + z^2$. At the horizontal distance $R_h$ from the radar antenna 220, the radar pulse beam scans a circle with a circumference $C = 2\pi R_h$. If there are k azimuth bins that the radar receiver 206 obtains measurements from then each bin represents a distance along the circle of $d_b = (k/C) = k/(2\pi)R_h$. Each radar pulse covers a distance around the circle of $d_p = R\Delta\theta$ azimuthally, where $\Delta\theta$ is the angular distance that the pulse covers in radians. Therefore each pulse covers n bins where $n = d_p/d_b = kR\Delta\theta/(2\pi)Rh$. The results in the altitude z and elevation angle φ being:

$$z = \sqrt{R^2\left(1 - \left(\frac{k\Delta\theta}{2\pi n}\right)^2\right)} \qquad \text{eq 1}$$

$$\varphi = \cos^{-1}\left(\frac{k\Delta\theta}{2\pi n}\right) \qquad \text{eq 2}$$

The values for the altitude position z and the elevation estimation φ are the provided to the horizontal displacement determination mechanism 228 where the horizontal displacement x and y can be determined in a manner similar to that performed by the horizontal displacement determination mechanism 228 in the straight path tracking mechanism 232.

Each individual measured point obtained from the radar signal is processed in a similar manner by the separate altitude determination mechanism 222 with the elevation determination mechanism 230 and the horizontal displacement determination mechanism 228. These points are fit to a curve to form the optimal path for the object indicating the path that the object traveled.

Information on the optimal path is provided to the path determination control mechanism 224 from the straight path tracking mechanism 232 or the separate altitude determination mechanism 222. The path determination mechanism 224 stores the optimal path in a path data storage 244, containing information on optimal paths for multiple objects. A path presentation mechanism 240 may then be supplied with the optimal path information for display of the path.

FIGS. 4A to E show a flow chart representing a method 300 of tracking objects in flight using radar according to an embodiment of the present invention. Steps 302 to 312 of the method 300 show the process of obtaining measurements where as steps 314 to 388 show the process of deriving three-dimensional position information from the two-dimensional measurements.

A radar pulse sequence is initialized in step 302 to set up the various characteristics of the radar pulse such as frequency, duration, etc. The radar pulse sequence is transmitted in step 304. The radar pulse reflection detection is initialized in step 306 to set up the various characteristics for detecting radar pulses that are reflected back, such as azimuth bin size, etc. Reflected radar pulses are received in step 308 and digitized in step 310 to convert the received pulses from an analog signal to a digital signal. The digitized radar signal is then stored in step 312.

The stored radar signal is obtained in step 314 and examined in step 316 to determine if the information in the radar signal indicates the presence of an object in flight within range of the transmitted radar pulses. If it is determined in step 318 that an object has been located then the object is isolated from the radar signal at various locations and points in time in step 320; otherwise a new saved radar signal is obtained in step 314.

After the object has been isolated from the radar signal at various measured points the number of these points is determined in step 322 and compared against a predetermined number in step 324. If the number of measured points is equal to or greater than the predetermined number then estimated elevation angles spanning the range of the beam of the radar pulse are provided in step 326. By providing all elevation angles in the range of the beam of the radar all possible elevation angles are considered. The altitude for each measured point at each estimated elevation angle is determined in step 328. The horizontal displacement corresponding to each altitude is determined in step 330.

After the altitude and horizontal displacement have been determined path information is derived in step 332 for each estimated elevation angle. The elevation angle is assumed to remain constant while the object is within range of the radar; thus, all measured points at a given elevation angle form a path. The curvature of each path, corresponding to each estimated elevation angle, is determined in step 334 to form a basis upon which the optimal path can be determined in step 336. The optimal path is the path with the least curvature, or the straightest path.

Estimation of the elevation angle is then refined in steps 338 to 348. Estimated fractional elevation angles having a greater degree of precision than the estimated elevation angles are provided in step 338. The estimated fractional elevation angles are determined within a predetermined range of the optimal estimated elevation angle corresponding to the optimal path determined in step 336. The altitude for each measured point at each estimated fractional elevation angle is determined in step 340 and used to determine corresponding horizontal displacement for each measured point in step 342. Path information is derived for the altitude and horizontal displacement for each measured point at a given estimated fractional elevation angle in step 344 in a manner similar to that performed in step 338. The curvature for each path is determined in step 346 and used to find the optimal path based on the estimated fractional elevation angle in step 348. Steps 338 to 348 perform the same functions as steps 326 to 336 only with a greater degree of precision.

The optimal path is assessed in step 350 to determine if it is straight. If the optimal path is straight then it is stored in step 390. If the optimal path is not straight then a path determination process similar to steps 326 to 348 is performed on segments of the measured points. If the optimal path is not straight then segments are determined from the measured points in step 352. These segments may be determined to provide a predetermined number of measured points in each segment or the segments may be determined according to various characteristics of the values of successive measured points. Steps 354 to 376 then perform the same function as steps 326 to 348 on each segment of the measured points, not the entire set of measured points.

After the segments of measured points have been determined, estimated elevation angles spanning the range of the beam of the radar pulse are provided for each segment of measured points in step 354. The altitude for each measured point in each segment at each estimated elevation angle is determined in step 356. The horizontal displacement corresponding to each altitude is determined in step 358.

After the altitude and horizontal displacement for each measured point in each segment have been determined, path information is derived for each segment with each estimated elevation angle in step 360. The curvature of each path for each segment, corresponding to each estimated elevation angle for each segment, is determined in step 362. The curvature for each path for each segment forms a basis upon which the optimal path can be determined in step 364. The optimal path is the path with the least curvature, or the straightest path.

Estimation of the elevation angle is then refined in steps 366 to 376. Estimated fractional elevation angles having a greater degree of precision than the estimated elevation angle are provided for each segment of measured points in step 366. The estimated fractional elevation angles for each segment are determined within a predetermined range of the optimal estimated elevation angle corresponding to the optimal path for each segment determined in step 364. The altitude for each measured point in each segment at each estimated fractional elevation angle is determined in step 368 and used to determined corresponding horizontal displacement for each measured point in step 370. Path information for each segment is derived for the altitude and horizontal displacement for each measured point for each segment at a given estimated fractional elevation angle in step 372 in a manner similar to that performed in step 360. The curvature for each path is determined in step 374 and used to find the optimal path based on the estimated fractional elevation angle in step 376. Steps 366 to 376 perform the same function as step 354 to 364 only with a greater degree of precision.

The results of steps 352 to 376 are assessed in step 378 to determine if the resulting path(s) are straight. The paths derived from each segment may be analyzed with a single path not being straight resulting in a determination of no straight paths either for that segment or for the entire set of measured points. If the path for each segment is straight then all paths are combined to derive a single path in step 380 and stored in step 390. If at least one segment was not straight then steps 382 to 388 may be performed either on the entire set of measured points or only on the segment(s) that were determined not to be straight.

If the number of measured points is less than the predetermined number as determined in step 324 or if the measured points will not form a straight path as determined in step 378 then a separate process for determining the position of the object and a path is used, shown in step 382 to 388. In steps 382 to 388 the elevation angle and altitude at each individual measured point is determined so that the path may not have a consistent elevation angle, as did the path determined from steps 326 to 376. An elevation angle and altitude for a single point from the measured points is determined in step 382. The corresponding horizontal displacement for the single point is determined in step 384. In step 386 it is determined if all measured points have been processed to provide elevation angle, altitude and horizontal displacement. If not all points have been processed then steps 382 and 384 are repeated.

After the elevation angle, altitude and horizontal displacement have been determined for each measured point in either the segment or the entire set of measured points then a path is derived therefrom in step 388. This path may contain path segments determined by the process of steps 352 to 376 and step 382 to 386 or only the coordinates of measured points determined from steps 382 to 386.

Once a path has been determined it is stored in step 390 and presented for display in step 392.

It is apparent to one skilled in the art that numerous modifications and departures from the specific embodiments described herein may be made without departing from the spirit and scope of the invention.

INDUSTRIAL APPLICABILITY

The present invention relates to the industrial field of object tracking via radar.

The invention claimed is:

1. A method of determining a path in three-dimensions for an object in flight comprising:
  (a) transmitting a radar signal at an angle sufficient to locate the object within said transmitted radar signal, said transmitted radar signal being reflected by the object to form a reflected radar signal containing an indication of a position of the object;
  (b) receiving said reflected radar signal;
  (c) determining position information in two-dimensions for the object by detecting said indication of the position of the object in said received radar signal;
  (d) deriving position information in three-dimensions from said position information in two-dimensions; and
  (e) obtaining path information representing the path for the object by optimizing a curvature of a path formed by said position information in three-dimensions.

2. The method according to claim 1 wherein the step of determining said position information in two-dimensions includes:
  (c-i) examining said received radar signal to detect a change in strength of said received radar signal greater than a predetermined threshold, said change in strength representing said indication of the position of the object; and
  (c-ii) isolating a plurality of said changes in strength from said received radar signal to form a plurality of detection points representing the object at a plurality of points in time, said plurality of detection points forming said position information in two-dimensions and including two measurements for each detection point; and wherein the step of deriving position information in three-dimensions includes:
  (d-i) estimating third measurements within a predetermined range in a width of said transmitted radar signal, said third measurements and said position information in two-dimensions forming said position information in three-dimensions for each estimated third measurement;
and wherein the step of obtaining path information includes:
  (e-i) interpolating estimated path information in three-dimensions from said position information in three-dimensions;
  (e-ii) repeating steps (d-i) and (e-i) to form estimated path information for each estimated third measurement with a first predetermined precision within said predetermined range in the width of said transmitted radar signal; and
  (e-iii) evaluating said estimated path information for each estimated third measurement based on said curvature for said estimated path information to obtain an optimal path having an optimal curvature from said estimated path information for all estimated third measurements.

3. The method according to claim 2 wherein said optimal curvature indicates a curved path; and wherein the step of obtaining path information further includes:
  (e-iv) segmenting said plurality of detection points to form a plurality of detection point segments in two-dimensions;
  (e-v) deriving third measurements, within said predetermined range in said width of said transmitted radar signal, for each of said plurality of detection point segments to form a plurality of three-dimensional segments for each of said plurality of detection point segments;
  (e-vi) repeating steps (d-i) to (e-iii) to determine an optimal segment for each of said plurality of detection point segments from said plurality of three-dimensional segments based on an optimal curvature for estimated path information corresponding to each of said plurality of three-dimensional segments; and
  (e-vii) deriving a single path from said optimal path segments.

4. The method according to claim 3 wherein said optimal curvature for all estimated path information for said plurality of detection point segments indicates a curved path;
and wherein the step of obtaining path information further includes:
  (e-viii) deriving a third measurement for each of said plurality of detection points based on said two measurements and a geometric relationship between said two measurements and said third measurement, said third measurements and said plurality of detection points forming said position information in three-dimensions; and
  (e-iv) interpolating path information from said position information in three-dimensions.

5. The method according to claim 3 wherein said optimal curvature for one of said estimated path information for each of said plurality of three-dimensional segments for one of said plurality of detection point segments indicates a curved path;
and wherein the step of obtaining path information further includes:
  (e-ix) deriving a third measurement for each of said plurality of detection points in said one of said plurality of detection point segments corresponding to said estimated path information having said optimal curvature indicating a curved path, said third measurement being based on said two measurements and a geometric relationship between said two measurements and said third measurement, said third measurements and said plurality of detection points in said corresponding detection points segment forming said position information in three-dimensions; and (e-x) interpolating segment path information from said position information in three-dimensions for said one of said plurality of detection points segments.

6. The method according to claim 2 wherein said received radar signal includes a range to the object and an azimuth angle for the object and wherein the step of estimating includes:

(d-i-1) estimating an elevation angle within said predetermined range in the width of said transmitted radar signal;

and wherein the step of deriving estimated path information includes:

(e-i-1) converting said position information in three-dimensions into Cartesian coordinate format; and (e-i-2) formulating said estimated path information in three-dimensions from said position information in three-dimensions in Cartesian coordinate format.

7. The method according to claim 2 wherein the step of obtaining path information further includes:

(e-xi) repeating steps (d-i) to (e-iii) using estimated third measurements with a second predetermined precision greater than said first predetermined precision within a predetermined range of an estimated third measurement corresponding to said optimal path having said optimal curve.

8. The method according to claim 2 wherein the step of evaluating said estimated path information includes:

(e-iii-1) determining a curvature for said estimated path information for each estimated third measurement;

(e-iii-2) determining said optimal path having a smallest curve from said estimated path information for each estimated third measurement.

9. A system for determining a path in three-dimensions for an object in flight comprising:

a radar antenna for transmitting and receiving a radar signal, said radar antenna being positioned at an angle sufficient to locate the object within said radar signal beam, a transmitted radar signal being reflected by the object to form a received radar signal containing an indication of a position of the object;

a radar controller for managing transmission and receipt of said radar signal from said radar antenna;

a processing controller for determining position information in two-dimensions for the object by detecting said indication of the position of the object in said received radar signal; and a path derivation mechanism for deriving position information in three-dimensions from said position information in two-dimensions and obtaining path information representing the path for the object by optimizing a curvature of a path formed by said position information in three-dimensions.

10. The system according to claim 9 wherein said processing controller includes:

an object detection mechanism for detecting a change in strength of said received radar signal greater than a predetermined threshold, said change in strength representing said indication of the position of the object, and isolating a plurality of said changes from said received radar signal to form a plurality of detection points representing the object at a plurality of points in time, said plurality of detection points forming said position information in two-dimensions and including two measurements for each detection point.

11. The system according to claim 10 wherein said processing controller further includes:

a path determination control mechanism for assessing if said curvature of said path information indicates a curved path or a straight path; and a path segmentation mechanism for segmenting said plurality of detection points to form a plurality of detection point segments when said curvature indicates a curved path;

and wherein said path derivation mechanism includes:

a straight path mechanism for deriving position information in three-dimensions from said position information in two-dimensions and obtaining path information in three-dimensions for the object from said position information in three-dimensions, said straight path mechanism deriving position information and path information in three-dimensions for straight path information and for path information and detection point segments for which a curvature has not been determined; and a separate points mechanism for deriving position information in three-dimensions from said position information in two-dimensions and obtaining path information in three-dimensions for the object from said position information in three-dimensions when a curvature for one of said plurality of detection point segments indicates a curved path.

12. The system according to claim 11 wherein said straight path mechanism includes:

a measurement estimation mechanism for estimating a third measurement with a predetermined precision within a predetermined range in a width of said transmitted radar signal, said third measurement and said position information in two-dimensions forming said position information in three-dimensions;

a path derivation mechanism for interpolating estimated path information in three-dimensions from said position information in three-dimensions;

an optimization mechanism for comparing a plurality of estimated path information formed from a plurality of estimated third measurements to evaluate said plurality of estimated path information based on a curvature to obtain an optimal path having an optimal curvature from said plurality of estimated path information.

13. The system according to claim 12 wherein said optimization mechanism includes:

a curvature determination mechanism for determining a curvature for each of said plurality of estimated path information for each of said plurality of estimated third measurements; and a curvature assessment mechanism for determining said optimal path having a smallest curvature from said plurality of estimated path information.

14. The system according to claim 11 wherein said separate points mechanism includes:

a measurement estimation mechanism for deriving a third measurement for each of said plurality of detection points based on said two measurements and a geometric relationship between said two measurements and said third measurement, said third measurement and said plurality of detection points forming said position information in three-dimensions; and a path derivation mechanism for interpolating path information in three-dimensions from said plurality of detection points and corresponding third measurement.

15. A method of determining a path in three-dimensions for an object in flight comprising:
(a) transmitting a radar signal at an angle sufficient to locate the object within said transmitted radar signal, said transmitted radar signal being reflected by the object to form a reflected radar signal containing an indication of a position of the object;
(b) receiving said reflected radar signal;
(c) detecting said indication of the position of the object in said received radar signal, a plurality of said detected indications forming a plurality of detection points, said plurality of detection points producing position information in two-dimensions for the object, said received radar signal including two measurements for each detection points;
(d) deriving position information in three-dimensions from said position information in two-dimensions, comprising:
(d-i) estimating a third measurement within a predetermined range in a width of said transmitted radar signal when said anticipated path type indicates a straight path, said third measurement and said position information in two-dimensions forming said position information in three-dimensions;
(d-ii) deriving a third measurement for each of said plurality of detection points based on said two measurements and a geometric relationship between said two measurements and said third measurement when a curvature for said path information indicates a curved path and a plurality of detection point segments has been provided, said third measurements and said plurality of detection points forming said position information in three-dimensions; and
(e) obtaining path information representing the path for the object, comprising:
(e-i) interpolating estimated path information in three-dimensions from said position information in three-dimensions;
(e-ii) repeating steps (d-i) and (e-i) when said anticipated path type indicates a straight path to form estimated path information for each possible third measurement with a first predetermined precision within said predetermined range in the width of said transmitted radar signal;
(e-iii) when said curvature indicates a curved path, segmenting said plurality of detection points to form a plurality of detection point segments in two-dimensions;
(e-iv) when said curvature indicates a curved path, deriving third measurements, within said predetermined range in said width of said transmitted radar signal, for each of said plurality of detection point segments to form a plurality of three-dimensional segments for each of said plurality of detection point segments;
(e-v) repeating steps (d-i) to (e-ii) to determine an optimal curvature for each of said plurality of three-dimensional segments when said curvature indicates a curved path; and
(e-vi) when said curvature indicates a curved path, deriving a single path from optimal path segments formed from path information from one of the plurality of three-dimensional segments for each of said plurality of detection points having an optimal curvature.

16. The method according to claim 15 wherein the step of detecting said indication includes, prior to determining said anticipated path type:
(c-i) examining said received radar signal to detect a change in strength of said received radar signal greater than a predetermined threshold, said change in strength representing said indication of the position of the object; and
(c-ii) isolating a plurality of said changes from said received radar signal to obtain said plurality of detection points representing the object at a plurality of points in time, said plurality of detection points forming said position information in two-dimensions.

17. The method according to claim 15 wherein the step of obtaining path information further includes:
(e-vi) prior to step (e-iii), repeating steps (d-i) to (e-iii) when said anticipated path type indicates a straight path using estimated third measurements with a second predetermined precision greater than said first predetermined precision within a predetermined range of an estimated third measurement corresponding to said optimal path having said optimal curve.

18. The method according to claim 15 wherein the step of evaluating said estimated path information includes:
(c-v-1) determining a curvature for said estimated path information for each estimated third measurement; and
(e-v-2) determining said optimal path having a smallest curve from said estimated path information for each estimated third measurement.

19. A computer program product comprising:
a computer usable medium and computer readable code embodied on said computer usable medium for determining a path in three-dimensions for an object in flight, the computer readable code comprising:
computer readable code means for causing a computer to transmit a radar signal at an angle sufficient to locate the object within said transmitted radar signal, said transmitted radar signal being reflected by the object to form a reflected radar signal containing an indication of a position of the object;
computer readable code means for causing a computer to receive said reflected radar signal;
computer readable code means for causing a computer to determine position information in two-dimensions for the object by detecting said indication of the position of the object in said received radar signal;
computer readable code means for causing a computer to derive position information in three-dimensions from said position information in two-dimensions; and
computer readable code means for causing a computer to obtain path information representing the path for the object by optimizing a curvature of a path formed by said position information in three-dimensions.

20. The computer readable code according to claim 19 wherein the computer readable code means for causing a computer to determine position information includes:
computer readable code means for causing a computer to examine said received radar signal to detect a change in strength of said received radar signal greater than a predetermined threshold, said change in strength representing said indication of the position of the object; and
computer readable code means for causing a computer to isolate a plurality of said changes in strength from said received radar signal to obtain a plurality of detection points representing the object at a plurality of points in time, said plurality of detection points forming said position information in two-dimensions and including two-measurements for each detection point and wherein the computer readable code means for causing a computer to derive position information in three-dimensions includes:

computer readable code means for causing a computer to estimate third measurements within a predetermined range in a width of said transmitted radar signal, said third measurements and said position information in two-dimensions forming said position information in three-dimensions for each estimated third measurement; and wherein the step of obtaining path information includes:

computer readable code means for causing a computer to interpolate estimated path information in three-dimensions from said position information in three-dimensions;

computer readable code means for causing a computer to manage formation of estimated path information for each estimated third measurement with a first predetermined precision within said predetermined range in the width of said transmitted radar signal by repetitive execution of said code means to estimate a third measurement and said code means to interpolate estimated path information; and computer readable code means for causing a computer to evaluate said estimated path information for each estimated third measurement based on said curvature for said estimated path information to obtain an optimal path having an optimal curvature from said estimated path information for all estimated third measurements.

21. The computer readable code according to claim 20 wherein said optimal curvature indicates a curved path and wherein the computer readable code means for causing a computer to obtain path information further includes:

computer readable code means for causing a computer to segment said plurality of detection points to form a plurality of detection point segments in two-dimensions; and computer readable code means for causing a computer to derive third measurements, within said predetermined range in said width of said transmitted radar signal, for each of said plurality of detection point segments to form a plurality of three-dimensional segments for each of said plurality of detection point segments;

computer readable code means for causing a computer to manage determination of an optimal segment for each of said plurality of detection point segments from said plurality of three-dimensional segments based on an optimal curvature for estimated path information corresponding to each of said plurality of three-dimensional segments by repetitive execution of said code means to estimate a third measurement, said code means to interpolate estimated path information, said code means to manage formation and said code means to evaluate said estimated path information; and computer readable code means for causing a computer to derive a single path from said optimal segments.

22. The computer readable code according to claim 21 wherein said optimal curvature for all estimated path information for said plurality of detection point segments indicates a curved path and wherein the computer readable code means for causing a computer to obtain path information further includes:

computer readable code means for causing a computer to derive a third measurement for each of said plurality of detection points based on said two measurements and a geometric relationship between said two measurements and said third measurement, said third measurements and said plurality of detection points forming said position information in three-dimensions; and computer readable code means for causing a computer to interpolate path information from said position information in three-dimensions.

23. The computer readable code according to claim 21 wherein said optimal curvature for said plurality of estimated path information for each of said plurality of three-dimensional segments for one of said plurality of detection point segments indicates a curved path and wherein the computer readable code means for causing a computer to obtain path information further includes:

computer readable code means for causing a computer to derive a third measurement for each of said plurality of detection points in one of said plurality of detection points segments corresponding to said estimated path information from said plurality of path information having said optimal curvature indicating a curved path, said third measurement being based on said two measurements and a geometric relationship between said two measurements and said third measurement, said third measurements and said plurality of detection points in said corresponding detection points segment forming said position information in three-dimensions; and computer readable code means for causing a computer to interpolate segment path information from said position information in three-dimensions for said corresponding one of said plurality of detection points segments.

24. The computer readable code according to claim 20 wherein said received radar signal includes a range to the object and an azimuth angle for the object and wherein the computer readable code means for causing a computer to estimate includes:

computer readable code means for causing a computer to estimate an elevation angle within said predetermined range in the width of said transmitted radar signal, and wherein the computer readable code means for causing a computer to derive estimated path information includes:

computer readable code means for causing a computer to convert said position information in three-dimensions into Cartesian coordinate format; and computer readable code means for causing a computer to formulate said estimated path information in three-dimensions from said position information in three-dimensions in Cartesian coordinate format.

25. The computer readable code according to claim 20 wherein the computer readable code means for causing a computer to obtain path information further includes:

computer readable code means for causing a computer to manage repetitive execution of said code means to estimate a third measurement, said code means to interpolate estimated path information, said code means to manage formation and said code means to evaluate said estimated path information using estimated third measurements with a second predetermined precision greater than said first predetermined precision within a predetermined range of an estimated third measurement corresponding to said optimal path having said optimal curve.

26. The computer readable code according to claim 20 wherein the computer readable code means for causing a computer to evaluate said estimated path information includes:
computer readable code means for causing a computer to determine a curvature for said estimated path information for each estimated third measurement;
computer readable code means for causing a computer to determine said optimal path having a smallest curve from said estimated path information for each estimated third measurement.

27. A computer program product comprising:
a computer usable medium and computer readable code embodied on said computer usable medium for determining a path in three-dimensions for an object in flight comprising:
computer readable code means for causing a computer to transmit a radar signal at an angle sufficient to locate the object within said transmitted radar signal, said transmitted radar signal being reflected by the object to form a reflected radar signal containing an indication of a position of the object;
computer readable code means for causing a computer to receive said reflected radar signal;
computer readable code means for causing a computer to detect said indication of the position of the object in said received radar signal, a plurality of said detected indications forming a plurality of detection points, said plurality of detection points producing position information in two-dimensions for the object, said received radar signal including two measurements for each of detection point;
computer readable code means for causing a computer to derive position information in three-dimensions from said position information in two-dimensions, comprising:
computer readable code means for causing a computer to estimate a third measurement within a predetermined range in a width of said transmitted radar signal when said anticipated path type indicates a straight path, said third measurement and said position information in two-dimensions forming said position information in three-dimensions; and
computer readable code means for causing a computer to derive a third measurement for each of said plurality of detection points based on said two measurements and a geometric relationship between said two measurements and said third measurement when a curvature for said path information indicates a curved path and a plurality of detection point segments has been provided, said third measurements and said plurality of detection points forming said position information in three-dimensions; and
computer readable code means for causing a computer to obtain path information representing the path for the object, comprising:
computer readable code means for causing a computer to interpolate estimated path information in three-dimensions from said position information in three-dimensions;
computer readable code means for causing a computer to manage formation of estimated path information for each possible third measurement with a first predetermined precision within said predetermined range in the width of said transmitted radar signal when said anticipated path type indicates a straight path by repetitive execution of said code means to estimate a third measurement and said code means to interpolate estimated path information;
computer readable code means for causing a computer to when said curvature indicates a curved path, segment said plurality of detection points to form a plurality of detection point segments in two-dimensions;
computer readable code means for causing a computer to derive third measurements, within said predetermined range in said width of said transmitted radar signal, for each of said plurality of detection point segments to form a plurality of three-dimensional segments for each of said plurality of detection point segments;
computer readable code means for causing a computer to manage determination of an optimal curvature for each of said plurality of detection point segments by repetitive execution of said code means to estimate a third measurement, said code means to interpolate estimated path information and said code means to manage formation; and
computer readable code means for causing a computer to when a curvature for one of said plurality of detection point segments indicates a curved path, derive a single path from optimal path segments formed from path information from one of the plurality of three-dimensional segments for each of said plurality of detection points having an optimal curvature.

28. The computer readable code according to claim 27 wherein the computer readable code means for causing a computer to detect said indication includes, prior to determining said anticipated path type:
computer readable code means for causing a computer to examine said received radar signal to detect a change in strength of said received radar signal greater than a predetermined threshold, said change in strength representing said indication of the position of the object; and
computer readable code means for causing a computer to isolate a plurality of said changes from said received radar signal to obtain said plurality of detection points representing the object at a plurality of points in time, said plurality of detection points forming said position information in two-dimensions.

29. The computer readable code according to claim 28 wherein the computer readable code means for causing a computer to obtain path information further includes:
computer readable code means for causing a computer to manage repetitive execution of said code means to estimate a third measurement, said code means to interpolate estimated path information, said code means to manage formation and said code means to segment said plurality of detection points prior to step (e-iii), when said anticipated path type indicates a straight path using estimated third measurements with a second predetermined precision greater than said first predetermined precision within a predetermined range of an estimated third measurement corresponding to said optimal path having said optimal curve.

30. The computer readable code according to claim 27 wherein the computer readable code means for causing a computer to evaluate said estimated path information includes:
computer readable code means for causing a computer to determine a curvature for said estimated path information for each estimated third measurement; and computer readable code means for causing a computer to determine said optimal path having a smallest curve from said estimated path information for each estimated third measurement.

31. A method of determining a path in three-dimensions for an object in flight comprising:
(a) transmitting a radar signal at an angle sufficient to locate the object within said transmitted radar signal, said transmitted radar signal being reflected by the object to form a reflected radar signal containing an indication of a position of the object;
(b) receiving said reflected radar signal;
(c) determining two-dimensional position information for the object by detecting said indication of the position of the object in said received radar signal;
(d) deriving three-dimensional position information from said two-dimensional position information for each of a plurality of third dimension estimates in a range of the radar signal with a first predetermined precision;
(e) deriving estimated path information in three-dimensions from said three- dimensional position information for each of the plurality of third dimension estimates, each estimated path information representing the path for the object at one of the plurality of third dimension estimates; and
(f) evaluating said estimated path information for each of the plurality of third dimension estimates based on a curvature of said estimated path information to obtain an optimal path of a first predetermined precision having an optimal curvature.

32. The method according to claim 31 wherein said optimal curvature indicates a curved path, said method further including:
segmenting said two-dimensional position information to form a plurality of two- dimensional segments;
deriving a three-dimensional segment for each of said plurality of two- dimensional segments for each of said plurality of third dimensional estimates to form a plurality of three-dimensional segments for each of said plurality of third dimension estimates;
evaluating each of said plurality of three-dimensional segments for each of said plurality of third dimension estimates based on a curvature of each three-dimensional segment to determine one of said plurality of third dimension estimates having the greatest number of three-dimensional segments with an optimal curve;
deriving a single path from said plurality of plurality of three-dimensional segments for said determined third dimension.

33. The method according to claim 31 further:
(g) repeating steps (d) to (f) using a plurality of third dimension estimates with a second predetermined precision greater than said first predetermined precision within a predetermined range of a third dimension estimate corresponding to said optimal path having said optimal curve.

34. The method according to claim 31 wherein the step of evaluating said estimated path information includes:
determining a curvature for said estimated path information for each of said plurality of third dimension estimates;
determining said optimal path having a smallest curve from said estimated path information for each of said plurality of third dimension estimates.

35. A system for determining a path in three-dimensions for an object in flight comprising:

a radar antenna for transmitting and receiving a radar signal, said radar antenna being positioned at an angle sufficient to locate the object within said radar signal beam, a transmitted radar signal being reflected by the object to form a received radar signal containing an indication of a position of the object;
a radar controller for managing transmission and receipt of said radar signal from said radar antenna;
a processing controller for determining two-dimensional position information for the object by detecting said indication of the position of the object in said received radar signal;
an estimation mechanism for deriving three-dimensional position information from said two-dimensional position information for each of a plurality of third dimension estimates in a range of the radar signal with a first predetermined precision;
a path derivation mechanism for deriving estimated path information in three- dimensions from said three-dimensional position information for each of the plurality of third dimension estimates, each estimated path information representing the path for the object at one of the plurality of third dimension; and
an optimization mechanism for evaluating said estimated path information for each of the plurality of third dimension estimates based on a curvature of said estimated path information to obtain an optimal path of a first predetermined precision having an optimal curvature.

36. The system according to claim 35 wherein said processing controller includes:
a path segmentation mechanism for segmenting said two-dimensional position information to form a plurality of two-dimensional segments; and wherein said an estimation mechanism receives said plurality of two-dimensional segments for deriving a three-dimensional segment for each of said plurality of two- dimensional segments for each of said plurality of third dimensional estimates to form a plurality of three-dimensional segments for each of said plurality of third dimension estimates;
and wherein said optimization mechanism receives said plurality of three-dimensional segments for each of said plurality of third dimension estimates for evaluating each of said plurality of three-dimensional segments for each of said plurality of third dimension estimates based on a curvature of each three-dimensional segment to determine one of said plurality of third dimension estimates having the greatest number of three-dimensional segments with an optimal curve; and
said system further includes;
a path determination control mechanism for deriving a single path from said plurality of plurality of three-dimensional segments for said determined third dimension.

37. The system according to claim 35 wherein said optimization mechanism includes:
a curvature determination mechanism for determining a curvature for each of said plurality of estimated path information for each of said plurality of estimated third measurements; and
a curvature assessment mechanism for determining said optimal path having a smallest curvature from said plurality of estimated path information.

* * * * *